US012741452B2

(12) United States Patent
Maya et al.

(10) Patent No.: US 12,741,452 B2
(45) Date of Patent: Sep. 22, 2026

(54) HEAT AND SHOCK RESISTANT TRANSPARENT MEMBRANE

(71) Applicant: Kuraray Co., Ltd., Okayama (JP)

(72) Inventors: Diana Maya, Houston, TX (US); Edgard Chow, Houston, TX (US); Makoto Okamoto, Zwijndrecht (BE)

(73) Assignee: Kuraray Co., Ltd., Okayama (JP)

(*) Notice: Subject to any disclaimer, the term of this patent is extended or adjusted under 35 U.S.C. 154(b) by 591 days.

(21) Appl. No.: 18/118,364

(22) Filed: Mar. 7, 2023

(65) Prior Publication Data

US 2023/0311461 A1 Oct. 5, 2023

Related U.S. Application Data

(60) Provisional application No. 63/317,867, filed on Mar. 8, 2022.

(51) Int. Cl.

| | |
|---|---|
| ***B32B 27/08*** | (2006.01) |
| ***B32B 7/02*** | (2019.01) |
| ***B32B 27/30*** | (2006.01) |
| ***B32B 27/32*** | (2006.01) |
| ***B32B 27/34*** | (2006.01) |

(Continued)

(52) U.S. Cl.

CPC ................ *B32B 27/08* (2013.01); *B32B 7/02* (2013.01); *B32B 27/302* (2013.01); *B32B 27/306* (2013.01); *B32B 27/32* (2013.01); *B32B 27/34* (2013.01); *B65B 25/001* (2013.01); *B65B 55/02* (2013.01); *B65D 65/40* (2013.01); *B32B 2250/24* (2013.01); *B32B 2270/00* (2013.01); *B32B 2274/00* (2013.01); *B32B 2307/412* (2013.01); *B32B 2307/581* (2013.01); *B32B 2307/702* (2013.01); *B32B 2307/704* (2013.01); *B32B 2307/7244* (2013.01); *B32B 2307/7246* (2013.01); *B32B 2307/7376* (2023.05); *B32B 2439/46* (2013.01); *B32B 2439/70* (2013.01)

(58) Field of Classification Search

CPC ......... B32B 27/08; B32B 7/02; B32B 27/302; B32B 27/306; B32B 27/32; B32B 27/34; B32B 2250/24; B32B 2270/00; B32B 2274/00; B32B 2307/412; B32B 2307/581; B32B 2307/702; B32B 2307/704; B32B 2307/7244; B32B 2307/7246; B32B 2439/46; B32B 2439/70; B32B 7/12; B32B 2307/308; B32B 2307/748; B32B 2307/306; B32B 27/325; B32B 2307/558; B65B 25/001; B65B 55/02; B65B 55/14; B65D 65/40; B65D 75/522; B65D 81/34; A23B 2/30

See application file for complete search history.

(56) References Cited

U.S. PATENT DOCUMENTS 6,461,696 B1 * 10/2002 Ling ...................... B32B 27/34 428/476.3

FOREIGN PATENT DOCUMENTS

WO WO-9954133 A2 * 10/1999 ............ B32B 27/08

* cited by examiner

*Primary Examiner* — Michael C Miggins
(74) *Attorney, Agent, or Firm* — Morgan, Lewis & Bockius LLP

(57) ABSTRACT

The present disclosure provides a multilayer structure including a first polyolefin layer comprising a first polyolefin resin, a gas barrier layer comprising ethylene-vinyl alcohol copolymer, and a second polyolefin layer comprising a second polyolefin resin. The present disclosure further provides a package made of the multilayer structure and also methods of use thereof.

20 Claims, 1 Drawing Sheet

Out A (a = d + e)
B (b)
In C (c)

b : EVOH
c, d : PP
e : Elastomer

(51) Int. Cl.

| | |
|---|---|
| ***B65B 25/00*** | (2006.01) |
| ***B65B 55/02*** | (2006.01) |
| ***B65D 65/40*** | (2006.01) |

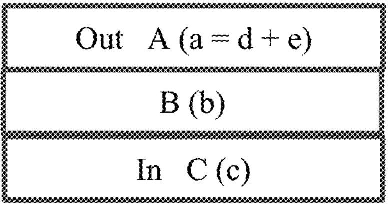
b : EVOH
c, d : PP
e : Elastomer

HEAT AND SHOCK RESISTANT TRANSPARENT MEMBRANE

FIELD OF THE INVENTION

The present invention relates to a multilayer structure including polyolefin layers and a barrier layer including an ethylene-vinyl alcohol copolymer ("EVOH"), a packaging comprising the aforementioned multilayer structure, and a method of packaging food using the aforementioned multilayer structure. The multilayer article may be transparent and retains its transparency even when heated and agitated. The multilayer article may be used for various applications, including use in food packaging.

BACKGROUND OF THE INVENTION

Sterilized and preserved food is commonly stored in glass bottles and metal cans. As an alternative to these rigid containers, retort pouches have gained widespread use in recent years. These retort pouches are typically made of plastic polymers and can be made as rigid or semi-rigid containers and can be shaped in many ways.

Ethylene-vinyl alcohol copolymer ("EVOH") is known for its low permeation of gases and volatile organic compounds relative to other commonly-used thermoplastic polymers. When laminated into a multilayer structure, EVOH can impart such benefits to the resulting packaging material. Moreover, the laminated material including EVOH may be transparent and may allow consumers to view the content of the pouch. The laminated material, however, may deteriorate due to conditions such as heat, moisture, and physical agitation. For example, transparency of the material can decrease during, for example, the process of packaging food that requires sterilization and shaking, or while heating the package prior to consumption of the food contained therein. Moreover, these conditions can also lead to delamination of the material.

SUMMARY OF THE INVENTION

According to some aspects of the present invention, a multilayer structure provided herein may demonstrate an excellent tolerance to conditions that lead to deterioration, such as heat, moisture, agitation, and/or other types of physical and mechanical forces.

In one aspect, the present disclosure relates to a multilayer structure comprising a first polyolefin layer comprising a first polyolefin resin, a gas barrier layer comprising ethylene-vinyl alcohol copolymer, and a second polyolefin layer comprising a second polyolefin resin. In some embodiments, the gas barrier layer is between the first and second polyolefin layer, and a ratio of a water vapor transmission rate (WVTR) of the first polyolefin layer (A) to a WVTR of the second polyolefin layer (B) (A/B) is ≥2.0. In some embodiments, the first polyolefin layer further comprises an elastomer. In some embodiments, the gas barrier layer is between the first and second polyolefin layer.

In one aspect, the present disclosure relates to a package comprising the multilayer structure described herein. In another aspect, the present disclosure relates to a method of packaging in the multilayer structure described herein. In some embodiments, the packaging comprises food packaging. In another aspect, the method comprises packaging retort food.

In another aspect, the present disclosure relates to use of a multilayer structure described herein for packaging. In another aspect, the present disclosure relates to use of a multilayer structure described herein for packaging food.

These and other embodiments, features and advantages of the present invention will be more readily understood by those of ordinary skill in the art from a reading of the following detailed description.

BRIEF DESCRIPTION OF THE DRAWINGS

FIG. 1 is a schematic diagram of an embodiment of a multilayer structure in accordance with the present invention.

DETAILED DESCRIPTION

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used, it is used to mean a certain effect or result can be obtained within a certain tolerance, and the skilled person knows how to obtain the tolerance. When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion" or "predominantly", as used herein, unless otherwise defined herein, means greater than 50% of the referenced material. If not specified, the percent is on a molar basis when reference is made to a molecule (such as hydrogen and ethylene), and otherwise is on a mass or weight basis (such as for additive content).

The term "substantial portion" or "substantially", as used herein, unless otherwise defined, means all or almost all or the vast majority, as would be understood by the person of ordinary skill in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 mol % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

As used herein, the term "block copolymer" refers to copolymers in which chemically distinct monomer units are grouped in discrete blocks along the polymer chain. A block copolymer may comprise two or more homopolymer subunits linked by a covalent bond(s).

For convenience, many elements of the present invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

The multilayer structure described herein comprises polyolefin layers and a gas barrier layer that includes an ethylene-vinyl alcohol copolymer ("EVOH"). The multilayer article may be transparent and may retain its transparency even when heated and agitated. Further details are provided below.

Overview of Multilayer Structure

The multilayer structure described herein may include a first polyolefin layer, a gas barrier layer, and a second polyolefin layer. In some embodiments, the first polyolefin layer may comprise a first polyolefin resin, and the second olefin layer may comprise a second polyolefin resin. In some embodiments, the first polyolefin layer further comprises an elastomer. In some embodiments, the gas barrier layer comprises ethylene-vinyl alcohol copolymer.

In some embodiments, the multilayer may contain one or more of each of the first polyolefin layer, the gas barrier layer, and the second polyolefin layer. For example, an exemplary embodiment of the multilayer structure may include two adjacent first polyolefin layers, a gas barrier layer, and a single second polyolefin layer. Similarly, another exemplary embodiment of the multilayer structure may include a single first polyolefin layer, two gas barrier layers with an intervening layer, and a second polyolefin layer. In yet another exemplary embodiment, the multilayer structure may include two first polyolefin layers, a gas barrier layer, and two second polyolefin layers.

In some embodiments, the multilayer structure may have additional layers. For example, an intervening layer may be placed between any combinations of the first polyolefin layer, the gas barrier layer, and the second polyolefin layer. Alternatively, one or more additional layers may sandwich one or more of the first polyolefin layer, the gas barrier layer, and the second polyolefin layer. For example, the multilayer structure may include a tie layer between the first polyolefin layer and the gas layer, or between the second polyolefin layer and the gas layer.

In some embodiments, the gas barrier layer may be between the first polyolefin layer and the second polyolefin layer. For example, the gas barrier layer may be directly adjacent to the first olefin layer or may have an intervening layer between itself and the first olefin layer. Similarly, the gas barrier layer may be directly adjacent to the second polyolefin layer or may have an intervening layer in between. The number of intervening layers between the gas barrier and the olefin layers is not limited to one but can be multiple layers.

In some embodiments, the multilayer structure may have the first polyolefin layer, the second polyolefin layer, or both the first and second polyolefin layers, on the outermost surface(s) of the multilayer structure. Alternatively, there can be additional layers shielding the first and the second polyolefin layers on the outside. In some embodiments, the first polyolefin layer may be used as the outermost layer and placed on the exterior surface of a package, and the second polyolefin layer may be used as the outermost layer on the opposite side of the multilayer structure and forms the interior surface of the same package.

The thickness of the multilayer structure is not particularly limited, and may typically be less than about 600, 550, 500, 450, 400, 350 or 300 μm, and/or more than about 100, 150, 200 250, 300, 350, 400, 450, 500, 550 μm. According to some embodiments, the layers of multilayer structure are organized in an asymmetric manner. For example, when a cross section of the multilayer structure is divided into equal half by an axis that divides the thickness of the multilayer in half, the layer structure of the upper half is different from the layer structure of the second half. In some embodiments, the thickness of each layer in the multilayer structure is different from one another. For example, a thickness of the first polyolefin layer, T1, is different from a thickness of the second polyolefin layer, T2, such that T1/T2 is less than about 1, equal to or less than about 0.9, equal to or less than about 0.8, equal to or less than about 0.7, equal to or less than about 0.6, or equal to or less than about 0.5.

In some embodiments, a ratio of a water vapor transmission rate (WVTR) of the first polyolefin layer (a) to a WVTR of the second polyolefin layer (B), calculated as (A/B), may be more than about 1, 1.1, 1.2, 1.3, 1.4, 1.5, 1.6, 1.7, 1.8, 1.9 or 2.0. In a preferred embodiment, when the multilayer structure has the A/B as disclosed herein, the movements of water molecules in the structure are easier, allowing a barrier layer in the structure has a faster oxygen barrier recovery, for example, during and/or retort process.

The multilayer structure according to some embodiments may be transparent and may retain its transparency even after exposure to environmental stress. For example, the multilayer structure remains transparent even after a sterilization process involving prolonged exposure to heat sufficient for sterilization and concurrent shaking of the structure. Moreover, the multilayer structure according to some embodiments have an excellent piercing strength and can withstand physical forces directly aimed at the structure. Given these benefits, the multilayer structure, in some embodiments, may be used as a packaging material for retort pouches that store preserved food.

In some embodiments, the multilayer structure described herein has a piercing strength measured according to JIS Z 1707: 2019 of about 9.0, 8.9, 8.8, 8.7, 8.6, 8.5, 8.4, 8.3, 8.2, 8.1, 8.0, 7.9, 7.8, 7.7, 7.6, 7.5, 7.4, 7.3 MPa or less, and/or about 8.7, 8.6, 8.5, 8.4, 8.3, 8.2, 8.1, 8.0, 7.9, 7.8, 7.7, 7.6, 7.5, 7.4, 7.3, 7.2, 7.1, 7.0, 6.9, 6.8, 6.0, 5.5 MPa or more.

First Polyolefin Layer

The multilayer structures discussed herein may include a first polyolefin layer and a second polyolefin layer. The first polyolefin layer comprises a first polyolefin resin. The first polyolefin resin is not limited to any particular type of resin but can be, for example, polymethylpentene or polypropylene. In some embodiments, the first polyolefin resin is a propylene homopolymer. In some embodiments, a content of the first polyolefin resin in the first polyolefin layer is equal to or more than about 50% by mass, equal to or more than about 60% by mass, equal to or more than about 70% by mass, equal to or more than about 80% by mass, or equal to or more than about 85% by mass, relative to a mass of the whole first polyolefin layer.

In embodiments wherein the first polyolefin resin comprises polymethylpentene, a monomer other than the methylpenene may be copolymerized so long as its amount is small. Such monomers may be ethylene; α-olefins other than methylpentene such as propylene, 1-butene, and 1-hexene; (meth) acrylic acid ester; unsaturated carboxylic acid such as maleic acid, fumaric acid, itaconic acid; alkyl vinyl ether; N-(2-dimethylaminoethyl) methacrylamide or its quaternary; N-vinylimidazole or its quaternary; N-vinylpyrrolidone; N, N-butoxymethylacrylamide; vinyltrimethoxysilane; vinylmethyldimethoxysilane; and vinyldimethylmethoxysilane. A content of such monomeric units may be less than about 5% by mass relative to a mass of the whole polyolefin resin.

In embodiments wherein the first polyolefin resin comprises polypropylene, a monomer other than the propylene may be copolymerized so long as its amount is small. Such monomers may be ethylene; α-olefins other than propylene such as 1-butene, 1-hexene, 4-methyl-1-pentene, and 1-octene. A content of such monomeric units may be less than about 5% by mass, less than about 3% by mass, or less than about 2% by mass, relative to a mass of the whole polyolefin resin.

In some embodiments, the first polyolefin layer is porous. A porosity of the first polyolefin layer may be between about 1-20%. Having a porous first polyolefin layer in some embodiments allows vapor to quickly dissipate from the gas barrier layer, which may improve impermeability of the multilayer structure to gas even when the structure is treated with steam or hot water. Accordingly, in some embodiments in which the first polyolefin layer is porous, the layer may have an improved water vapor transmission rate (WVTR). In other embodiments, the first polyolefin layer may nonporous. A nonporous first olefin layer is superior in terms of its appearance as well as printability on its surface. In some embodiments, the first polyolefin layer may be situated on the exterior surface (i.e., outside) of a package made with the multilayer structure.

The thickness of the first polyolefin layer (T1) is not particularly limited. In some embodiments, the first polyolefin layer may have a thickness (T1) between about 1 micron and about 100 μm, between about 2 μm and 90 μm, or between about 5 μm and about 80 μm. In some embodiments, the first polyolefin layer, T1, has a thickness of at least 1, 5, 10, 15, 20, 25, 30, 35, 40, 45, 50, 55, 60, 65, or 70 μm, and/or about 100, 95, 90, 85, 80, 75, 70, 65, 60, 55, 50 μm or less.

In some embodiments, the first polyolefin resin has a glass transition temperature (Tg) that is different from the Tg of the elastomer. For example, the difference between the two glass transition temperatures may be more than about 5, 6, 7, 8, 9, 10, 11, 2, 13, 14, 15, 16, 17, 18, 19, 20, 21, 22, 23, 24, 25, 26, 27, 28, 29 or 30° C. and/or less than about 15, 16, 17, 17, 18, 19, 20, 21, 22, 23, 24, 25, 26, 27, 28, 29, 30, 31, 32, 33, 34, 35, 36, 37, 38, 39, 40, 41, 42, 43, 44, or 45° C.

Elastomer

The first polyolefin layer may additionally comprise an elastomer. The amount of the elastomer added to the first polyolefin layer is not limited to any particular range and may be between about 1% by mass and about 60% by mass, or between about 1% by mass and 50% by mass, or between about 1% by mass and 40% by mass, relative to the total mass of the first olefin layer. Preferably, the amount of the elastomer in the first olefin layer is about 30% by mass relative to the total mass of the first olefin layer. In some embodiments, the elastomer in the first polyolefin layer may comprise one or more block copolymers. In some embodiments, the elastomer in the first polyolefin layer may comprise a low crystalline or amorphous α-olefin copolymer. For example, the elastomer may comprise a block copolymer having an aromatic vinyl polymer block and an aliphatic polymer block (known under its commercial name of "HYBRAR™" from KURARAY), or a hydrogenated product thereof. The aliphatic polymer block may be saturated or unsaturated. Alternatively, in other examples, the elastomer may comprise a different type of low crystalline or amorphous α-olefin copolymer, such as a copolymer comprising a polypropylene-modified polyethylene, known as TAFMER™ available from MITSUI CHEMICALS. A content of the one or more block copolymer in the elastomer may be more than about 50, 55, 60, 65, 70, 75, 80, 85, 90, 95, 96, 97, 98, 99 or 100% by mass, relative to the total mass of the elastomer.

In embodiments in which the elastomer comprises a block copolymer having an aromatic vinyl polymer block and an aliphatic unsaturated polymer block, the binding form of these polymer blocks is not particularly limited, and it may be any of a linear binding form, a branched binding form, a radial binding form, and a combined binding form of two or more thereof. Of those, a linear binding form is preferred.

When the aromatic vinyl polymer block is expressed as "a", and the aliphatic unsaturated polymer block is expressed as "b", examples of the linear binding form include a diblock copolymer expressed by a–b, a triblock copolymer expressed by a–b–a or b–a–b, a tetrablock copolymer expressed by a–b–a–b, a pentablock copolymer expressed by a–b–a–b–a or b–a–b–a–b, an (a–b)nX type copolymer (X represents a coupling residual group, and n represents an integer of 2 or more), and a mixture thereof. Of those, a diblock copolymer, a triblock copolymer is preferred, and the triblock copolymer is more preferably a triblock copolymer expressed by a–b–a (i.e., a triblock copolymer having aromatic vinyl polymer end blocks and an aliphatic unsaturated polymer mid-block).

A sum total of an aromatic vinyl monomer unit and an aliphatic unsaturated monomer unit in the block copolymer is preferably about 80% by mass or more, or about 95% by mass or more, or about 98% by mass or more relative to the whole of the monomer units. It is to be noted that a part or the whole of the aliphatic unsaturated hydrocarbon polymer blocks in the block copolymer may be hydrogenated.

In some embodiments, a content of the aromatic vinyl monomer unit in the block copolymer is about 5% by mass or more, or about 7% by mass or more, or about 8% by mass or more, or about 14% by mass or more, or about 16% by mass or more, or about 18% by mass or more, relative to the whole of the monomer units of the block copolymer. A content of the aromatic vinyl monomer unit is preferably about 40% by mass or less, or about 30% by mass or less, or about 25% by mass or less, or about 20% by mass or less, relative to the whole of the monomer units of the block copolymer.

In the aromatic vinyl polymer block, a monomer other than the aromatic vinyl monomer may be copolymerized so long as its amount is small. A proportion of the aromatic vinyl monomer unit in the aromatic vinyl polymer block is preferably about 80% by mass or more, or about 95% by mass or more, or about 98% by mass or more relative to the whole of the monomer units in the aromatic vinyl polymer block.

Examples of the aromatic vinyl monomer constituting the aromatic vinyl polymer block include styrene; alkylstyrenes, such as α-methylstyrene, 2-methylstyrene, 3-methylstyrene, 4 methylstyrene, 4-propylstyrene, 4-cyclohexylstyrene and 4-dodecylstyrene; arylstyrenes, such as 2-ethyl-4-benzylstyrene, 4-(phenylbutyl)styrene, 1-vinylnaphthalene and 2-vinylnaphthalene; halogenated styrenes; alkoxystyrenes; vinylbenzoate esters; and the like. These aromatic vinyl monomers may be used solely or may be used in combination of two or more thereof.

In some embodiments, a content of styrene in the block copolymer is preferably about 1% by mass or more, about 2% by mass or more, about 3% by mass or more, about 4% by mass or more, or about 5% by mass or more, relative to the whole of the monomer units of the block copolymer. Further, in some embodiments, a content of styrene in the block copolymer is preferably about 70% by mass or less, about 65% by mass or less, about 60% by mass or less, about 55% by mass or less, about 50% by mass or less, about 55% by mass or less, or about 40% by mass or more, relative to the whole of the monomer units of the block copolymer.

A content of the aliphatic unsaturated monomer unit in the block copolymer is preferably about 60% by mass or more, or about 70% by mass or more, or about 75% by mass or more, or 80% by mass or more, relative to the whole of the monomer units of the block copolymer. The content of the aliphatic unsaturated monomer unit in the block copolymer is preferably about 95% by mass or less, or about 92% by mass or less, or about 90% by mass or less, or about 88% by mass or less, or about 86% by mass or less, or about 84% by mass or less, or about 82% by mass or less, relative to the whole of the monomer units of the block copolymer.

In the aliphatic unsaturated polymer block, a monomer other than the aliphatic unsaturated monomer may be copolymerized so long as its amount is small. A proportion of the aliphatic unsaturated monomer unit in the aliphatic unsaturated polymer block is preferably about 80% by mass or more, or about 95% by mass or more, or about 98% by mass or more, relative to the whole of the monomer units in the aliphatic unsaturated polymer block.

Examples of the aliphatic unsaturated monomer constituting the aliphatic unsaturated hydrocarbon polymer block include butadiene, isoprene, dicyclopentadiene, norbornene, acetylene, and the like. These aliphatic unsaturated monomers may be used solely or may be used in combination of two or more thereof.

From the viewpoints of ease of availability and handling properties, the aliphatic unsaturated monomer is preferably an aliphatic unsaturated hydrocarbon having 2 or more carbon atoms, or an aliphatic hydrocarbon having 4 or more carbon atoms, and is preferably an aliphatic unsaturated hydrocarbon having 12 or less carbon atoms, or an aliphatic hydrocarbon having 8 or less carbon atoms. Among those, butadiene, isoprene, and a combination of butadiene and isoprene are preferred. In some embodiments, the aliphatic unsaturated polymer block may contain about 20 mol % or more, 30 mol % or more, 40 mol % or more, or 50 mol % or more in total of the isoprene unit and the butadiene unit as the conjugated diene monomer unit.

In addition, from the viewpoints of easiness of availability and handling properties as well as easiness of synthesis, the aliphatic unsaturated monomer is preferably a conjugated diene. The content of the conjugated diene is not limited to any particular amount and may be about 20 mol % or more, about 30 mol % or more, about 40 mol % or more, about 50 mol %, or about 60 mol % or more, based on the aliphatic unsaturated polymer block. For example, in some embodiments, the aliphatic unsaturated polymer comprises polydiene, such as 3, 4-polyisoprene.

From the viewpoint of improving the heat stability, in the case of using a conjugated diene as the constituent unit of the aliphatic unsaturated hydrocarbon polymer block, the conjugated diene is preferably a hydrogenated product resulting from hydrogenating a part or the whole thereof. On that occasion, a hydrogenation ratio is preferably 80% or more, or 90% or more. The hydrogenation ratio as referred to herein is a value obtained by measuring an iodine value of the block copolymer before and after the hydrogenation reaction. Additionally, in some embodiments, the amount of residual carbon-carbon double bonds that may exist in the aliphatic unsaturated polymer block derived from conjugated diene monomer units may be from about 0% to about 50%, or from about 1% to 45%, or from about 2% to about 40%.

In embodiments in which the elastomer comprises a triblock copolymer having an aromatic vinyl polymer end blocks and an aliphatic saturated polymer mid-block, the binding form of these polymer blocks is not particularly limited, and it may be any of a linear binding form, a branched binding form, a radial binding form, and a combined binding form of two or more thereof. Of those, a linear binding form is preferred.

Examples of the aromatic vinyl monomer constituting the aromatic vinyl polymer end block include styrene; alkylstyrenes, such as α-methylstyrene, 2-methylstyrene, 3-methylstyrene, 4 methylstyrene, 4-propylstyrene, 4-cyclohexylstyrene and 4-dodecylstyrene; arylstyrenes, such as 2-ethyl-4-benzylstyrene, 4-(phenylbutyl)styrene, 1-vinylnaphthalene and 2-vinylnaphthalene; halogenated styrenes; alkoxystyrenes; vinylbenzoate esters; and the like. These aromatic vinyl monomers may be used solely or may be used in combination of two or more thereof.

When the aromatic vinyl polymer block is expressed as "a", and the aliphatic saturated polymer block is expressed as "b", examples of the linear binding form include a diblock copolymer expressed by a–b, a triblock copolymer expressed by a–b–a or b–a–b, a tetrablock copolymer expressed by a–b–a–b, a pentablock copolymer expressed by a–b–a–b–a or b–a–b–a–b, an (a–b)nX type copolymer (X represents a coupling residual group, and n represents an integer of 2 or more), and a mixture thereof. Of those, a diblock copolymer or a triblock copolymer is preferred, and the triblock copolymer is more preferably a triblock copolymer expressed by a–b–a (i.e., a triblock copolymer having aromatic vinyl polymer end blocks and an aliphatic saturated polymer mid-block).

A sum total of an aromatic vinyl monomer unit and an aliphatic saturated monomer unit in the block copolymer is preferably about 80% by mass or more, or about 95% by mass or more, or about 98% by mass or more relative to the whole of the monomer units. It is to be noted that a part or the whole of the aliphatic unsaturated hydrocarbon polymer blocks in the block copolymer may be hydrogenated. For example, the elastomer comprises a hydrogenated block copolymer (A) comprising hydrogenation of a block copolymer having two or more polymer blocks (a) containing structural units derived from an aromatic vinyl compound and one or more polymer blocks (b) containing structural units derived from isoprene and at least one structural unit derived from 1,3-butadiene.

A content of the aromatic vinyl monomer unit in the block copolymer is preferably about 5% by mass or more, or about 7% by mass or more, or about 8% by mass or more, or about 14% by mass or more, or about 16% by mass or more, or about 18% by mass or more, relative to the whole of the monomer units of the block copolymer. A content of the aromatic vinyl monomer unit is preferably about 40% by mass or less, or about 30% by mass or less, or about 25% by mass or less, or about 20% by mass or less, relative to the whole of the monomer units of the block copolymer.

In the aromatic vinyl polymer block, a monomer other than the aromatic vinyl monomer may be copolymerized so long as its amount is small. A proportion of the aromatic vinyl monomer unit in the aromatic vinyl polymer block is preferably about 80% by mass or more, or about 95% by mass or more, or about 98% by mass or more relative to the whole of the monomer units in the aromatic vinyl polymer block.

In some embodiments, a content of styrene in the block copolymer is preferably about 1% by mass or more, about 2% by mass or more, about 3% by mass or more, about 4% by mass or more, or about 5% by mass or more, relative to the whole of the monomer units of the block copolymer. Further, in some embodiments, a content of styrene in the block copolymer is preferably about 70% by mass or less, about 65% by mass or less, about 60% by mass or less, about 55% by mass or less, about 50% by mass or less, about 45% by mass or less, about 40% by mass or less, about 35% by mass or less, or about 30% by mass or less, relative to the whole of the monomer units of the block copolymer.

A content of the aliphatic saturated monomer unit in the block copolymer is preferably about 60% by mass or more, or about 70% by mass or more, or about 75% by mass or more, or 80% by mass or more, relative to the whole of the monomer units of the block copolymer. The content of the aliphatic saturated monomer unit in the block copolymer is preferably about 95% by mass or less, or about 92% by mass or less, or about 90% by mass or less, or about 88% by mass or less, or about 86% by mass or less, or about 84% by mass or less, or about 82% by mass or less, relative to the whole of the monomer units of the block copolymer.

In the aliphatic saturated polymer block, a monomer other than the aliphatic saturated monomer may be copolymerized so long as its amount is small. A proportion of the aliphatic saturated monomer unit in the aliphatic saturated polymer block is preferably about 80% by mass or more, or about 95% by mass or more, or about 98% by mass or more, relative to the whole of the monomer units in the aliphatic saturated polymer block.

Examples of the aliphatic saturated monomer constituting the aliphatic saturated hydrocarbon polymer block include ethylene, propylene, 1-butene, 1-pentene, 1 hexene, 1-heptene, 1-octene, 1-nonene, 1-decene, 4-phenyl-1-butene, 6-phenyl-1-hexene, 3 methyl-1-butene, 4-methyl-1-butene, 3-methyl-1-pentene, 4-methyl-1-pentene, 3 methyl 1 hexene, 4-methyl-1-hexene, 5-methyl-1-hexene, 3,3-dimethyl-1-pentene, 3,4 dimethyl-1-pentene, 4,4-dimethyl-1-pentene, vinylcyclohexane, hexafluoropropene, tetrafluoroethylene, 2-fluoropropene, fluoroethylene, 1,1-difluoroethylene, 3-fluoropropene, trifluoroethylene, 3,4-dichloro-1-butene, and the like. These aliphatic saturated monomers may be used solely or may be used in combination of two or more thereof. For instance, in some embodiments, the polymer block may comprise poly(3-methyl-1-butene), poly(1-butene), or a combination of poly(3-methyl-1-butene) and poly(1-butene).

An exemplary copolymer block according to some embodiments may be represented as shown in formula (I):

(I)

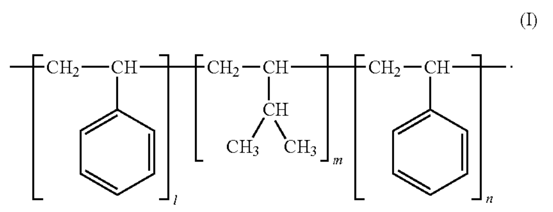

Another exemplary copolymer block according to some embodiments may be represented as shown in formula (II):

(II)

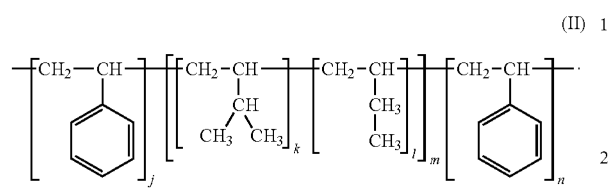

Random copolymer block

The aliphatic hydrocarbon polymer block may be modified. For example, the aliphatic hydrocarbon polymer block in some embodiments may comprise modified polyalkene or polydiene. In some embodiments, the modified polyalkene includes one or more of alkenes having 2 to 10 carbon atoms, and the modified polydiene includes one or more of dienes that having 2-10 carbon atoms.

In some embodiments, the elastomer described herein comprises a polypropylene-modified polyethylene. In some embodiments, the polypropylene-modified polyethylene has a softening point of about 160, 155, 150, 145 or 140° C. or lower.

From the viewpoints of mechanical characteristics and molding processability, a weight average molecular weight of the block copolymer is preferably about 30,000 or more, or about 50,000 or more and preferably about 400,000 or less, or about 300,000 or less. A ratio (Mw/Mn) of weight average molecular weight to number average molecular weight of the block copolymer is preferably about 1.0 or more, and preferably about 2.0 or less, or about 1.5 or less. Here, the weight average molecular weight refers to a weight average molecular weight as reduced into polystyrene as determined by the gel permeation chromatography (GPC) measurement, and the number average molecular weight refers to a number average molecular weight as reduced into polystyrene as determined by the GPC measurement.

In some embodiments, the block copolymer may have a glass transition temperature (Tg) of higher than about −60° C., higher than about −55° C., higher than about −50° C., higher than about −45° C., or higher than about −40° C. In some embodiments, the block copolymer of the elastomer may have a glass transition temperature (Tg) of less than about 10, 9, 8, 7, 6 or 5° C. with DSC at 10° C./min. In some embodiments, the block copolymer may have a glass transition temperature (Tg) from −40° C. to 10° C. with DSC at 10° C./min. The glass transition temperature may be measured in accordance with JIS K7121. More specifically, a DSC curve is obtained by differential scanning calorimetry under conditions where the temperature of the copolymer of the present invention is changed at 10° C./minute. From the DSC curve obtained while the temperature is being changed the second time, the midpoint glass transition temperature is determined, for use as the glass transition temperature of the present invention.

In some embodiments, the glass transition temperature of the elastomer may differ from the glass transition temperature of the first polyolefin resin. For example, the difference between the glass transition temperatures of the elastomer and the first polyolefin resin may be larger than 1° C., 2° C., 5° C., 10° C., 15° C., or 20° C.

In some embodiments, the glass transition temperature of the elastomer may differ from the glass transition temperature of polyolefin in the first polyolefin resin. For example, the difference between the glass transition temperatures of the elastomer and the polyolefin in the first polyolefin resin may be larger than 1° C., 2° C., 5° C., 10° C., 15° C., or 20° C.

Further, in some embodiments, the block copolymer has a melt flow rate (MFR) of from about 0.05, 0.1, 0.2, 0.3, 0.4, 0.5, 0.6, 0.7, 0.8, 0.9, 1.0, 1.1, 1.2, 1.3, 1.4 or 1.5 g/10 min, to about 2, 3, 4, 5, 6, 7, 8, 9 or 10 g/10 min, as determined in accordance with ISO1133 at 190° C. and 2.16 kg.

Further, in some embodiments, the block copolymer has a melt flow rate (MFR) of from about 1.0, 1.1, 1.2, 1.3, 1.4, 1.5, 2, 3, 4, 5, 6 or 7 g/10 min, to about 10, 15, 20, 21, 22, 23, 24, or 25 g/10 min, as determined in accordance with ISO1133 at 230° C. and 2.16 kg.

Furthermore, in some embodiments, the block copolymer described herein has a solution viscosity with a toluene solution at 30° C. and 20 wt % from about 10, 20, 30, 40, 50, 60, 70, or 80 mPa·s, to about 1000, 900, 800, 700, 600, 500, 400 or 300 mPa·s. In some embodiments, the block copolymer has a solution viscosity with a toluene solution at 30° C. and 30 wt % from about 200, 250, 300, 350, 400, 450, 500, 550, 600, 700, 800 or 900 mPa·s, from about 250 mPa·s, from about 300 mPa·s, or from about 350 mPa·s, to about 3000, 2500, 2000, 1500, 1000, 800 750, 700, 650, 600 or 650 mPa·s.

Barrier Layer

The multilayer structures discussed herein may include a gas barrier layer. The gas barrier may comprise ethylene-vinyl alcohol copolymer. A content of EVOH in the gas barrier layer may be more than about 50%, more than about 60%, more than about 70%, more than about 80%, more than about 90%, or more than about 95%, relative to the total mass of the gas barrier.

EVOH may be obtained by saponification of an ethylene-vinyl ester copolymer. In some embodiments, a content of the ethylene in the EVOH is between about 20-60 mol %, about 25-50 mol %, or about 30-40 mol %. An extent of saponification may, in some embodiments, be more than about 85 mol %, more than about 90 mol %, more than about 95 mol %, or more than about 99 mol %. The content of ethylene and the extent of saponification in EVOH can be measured using $^{1}$H-NMR.

A method of preparing the ethylene-vinyl alcohol copolymer may not be particularly limited, and may include well-known preparing methods. For example, in a general method, an ethylene-vinyl ester copolymer obtained by copolymerizing ethylene and vinyl ester monomer may be saponified under the presence of a saponification catalyst, in an organic solvent including alcohol. In some embodiments, the EVOH may be a copolymer having a main structural unit including an ethylene unit and a vinyl alcohol unit.

Examples of the vinyl ester monomer may include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Particularly, vinyl acetate is preferable.

A method of copolymerizing ethylene and vinyl ester monomer may include well-known methods such as solution polymerization, bulk polymerization, suspension polymerization, and emulsion polymerization. As a polymerization initiator, an azo-based initiator, peroxide-based initiator, redox-based initiator, and the like may be properly selected according to a polymerization method. At this time, the copolymerization may be performed under presence of thiol compounds such as thioacetic acid and mercaptopropionic acid, or other chain-transfer agents.

As a saponification reaction, alcoholysis, hydrolysis, and the like, which uses a well-known alkali catalyst or acidic catalyst as a saponification catalyst in an organic solvent, may be adopted. In particular, a saponification reaction using a caustic soda catalyst with methanol as a solvent is simple and easy, and thus, most preferable.

In some embodiments, the EVOH used may be a combination of two or more different types of EVOH. For example, the EVOH can be composed of a mixture of two or more types of EVOH that are different in ethylene unit content, with the combination having an ethylene content that is calculated as an average value from a mixed mass ratio. In this case, the difference between two types of EVOH that have different ethylene unit contents is typically about 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 mol % or less.

Similarly, the EVOH can be composed of a mixture of two or more types of EVOH that are different in degree of saponification, with the combination having a degree of saponification that is calculated as an average value from a mixed mass ratio. In this case, the difference in degree of saponification is typically about 7, 6, 5, 4, 3, 2, or 1% or less.

When a crosslinked product obtained from the EVOH is molded into a multilayered structure that is desired, as a multilayered structure, to achieve a balance between thermal moldability and oxygen barrier properties at a high level, the EVOH is preferably used that is obtained by mixing an EVOH having an ethylene unit content of from about 24 mol % to about 34 mol % and a degree of saponification of about 99% or greater, with an EVOH having an ethylene unit content of from about 34 mol % to about 50 mol % and a degree of saponification of about 99% or greater, in a blending mass ratio of about 60/40, 70/30, or 80/20 to about 90/10, or about 60/40 or 70/30 to about 80/20.

The ethylene unit content and the degree of saponification of the EVOH can be determined by conventional methods, such as nuclear magnetic resonance (NMR) analysis, as recognized by one of ordinary skill in the relevant art.

The EVOH may typically have, as a lower limit of a melt flow rate (a measured value at a temperature of 190° C. and a load of 2160 g in accordance with JIS K 7210), a melt flow rate of at least about 0.1, 0.5, 1, 3, 5, 10, 15, 20, 40, 60, 80, 100, or 150 g/10 min or more. On the other hand, the EVOH may typically have, as an upper limit of a melt flow rate, a melt flow rate of about 200, 180, 160, 140, 120, 100, 90, 80, 70, 60, 50, 40, 30, 10, 9, 8, 7, 6, 5, 4, 3, 2, or 1 g/10 min or less. The EVOH having a melt flow rate value in the above ranges may have improved melt kneadability and melt moldability and/or may impart these improved characteristics to a resin composition containing the EVOH.

The EVOH may be modified EVOH, which may include structural units other than the main structural unit. For example, a modified EVOH may have at least one structural unit selected from, for example, structural units (I) and (II) shown below.

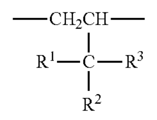

(I)

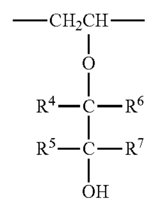

(II)

When present, such the structural unit are present at a ratio of at least about 0.5, 1.0, 2.0, 4.0, 6.0, 8.0, 10, 15, 20, or 25 mol % and/or not more than about 1.0, 2.0, 4.0, 6.0, 8.0, 10, 15, 20, 25, or 30 mol % based on the total structural units. Such a modified EVOH may improve flexibility and moldability of a resin or a resin composition, the interlayer adhesion, stretchability and thermoformability of the inner liner.

Each of $R^1$, $R^2$, and $R^3$ in the above formula (I) independently represents a hydrogen atom, an aliphatic hydrocarbon group having at least 1, 2, 3, 4, 5, 6, 7, 8, or 9 carbon atoms and/or not more than 2, 3, 4, 5, 6, 7, 8, 9, or 10 carbon atoms, an alicyclic hydrocarbon group having at least 3, 4, 5, 6, 7, 8, or 9 carbon atoms and/or not more than 4, 5, 6, 7, 8, 9, or 10 carbon atoms, an aromatic hydrocarbon group having at least 6, 7, 8, or 9 carbon atoms and/or not more than 7, 8, 9, or 10 carbon atoms, or a hydroxy group. Also, one pair of $R^1$, $R^2$, and $R^3$ may be combined together (excluding a pair of $R^1$, $R^2$ or $R^3$ in which both of them are hydrogen atoms). Further, the aliphatic hydrocarbon group having, for example, 1 to 10 carbon atoms, the alicyclic hydrocarbon group having, for example, 3 to 10 carbon atoms, or the aromatic hydrocarbon group having, for example, 6 to 10 carbon atoms may have the hydroxy group, a carboxy group or a halogen atom. On the other hand, each of $R^4$, $R^5$, $R^6$, and $R^7$ in the above formula (II) independently represents the hydrogen atom, the aliphatic hydrocarbon group having 1 to 10 carbon atoms, the alicyclic hydrocarbon group having 3 to 10 carbon atoms, the aromatic hydrocarbon group having 6 to 10 carbon atoms, or the hydroxy group. $R^4$ and $R^5$, or $R^6$ and $R^7$ may be combined together (excluding when both $R^4$ and $R^5$ or both $R^6$ and $R^7$ are hydrogen atoms). Also, the aliphatic hydrocarbon group having 1 to 10 carbon atoms, the alicyclic hydrocarbon group having 3 to 10-carbon atoms, or the aromatic hydrocarbon group having 6 to 10 carbon atoms may have the hydroxy group, an alkoxy group, the carboxy group or the halogen atom.

In another example, the following modified EVOH can be used as the EVOH, wherein the modified EVOH copolymer is represented by a following formula (III), contents (mol %) of a, b, and c based on the total monomer units that satisfy following formulae (1) through (3), and a degree of saponification (DS) defined by a following formula (4) and is not less than about 90, 91, 92, 93, 94, or 95 mol %.

(III)

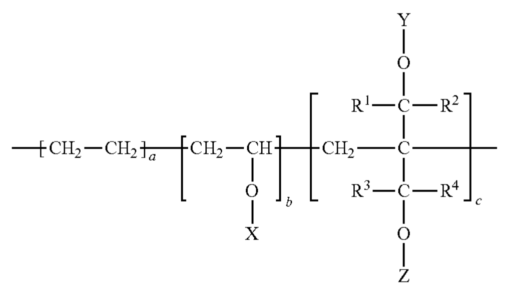

$$18 \leq a \leq 55 \quad (1)$$

$$0.01 \leq c \leq 20 \quad (2)$$

$$[100-(a+c)] \times 0.9 \leq b \leq [100-(a+c)] \quad (3)$$

DS=[(Total Number of Moles of Hydrogen Atoms in X, Y, and Z)/(Total Number of Moles of X, Y, and Z)]×100 (4)

In some embodiments, a may be at least 18, 20, 22, 24, 26, 28, 30, 32, 34, 36, 38, 40, 42, 44, 46, 48, 50, or 52 and not more than 20, 22, 24, 26, 28, 30, 32, 34, 36, 38, 40, 42, 44, 46, 48, 50, 52, or 55. In some embodiments, c may be at least 0.01, 0.05, 0.1, 0.2, 0.4, 0.6, 0.8, 1, 2, 4, 6, 8, 10, 12, 14, 16, or 18 and/or not more than 0.05, 0.1, 0.2, 0.4, 0.6, 0.8, 1, 2, 4, 6, 8, 10, 12, 14, 16, 18, or 20.

In the formula (III), each of $R^1$, $R^2$, $R^3$, and $R^4$ independently denotes a hydrogen atom or an alkyl group having a carbon number of at least 1, 2, 3, 4, 5, 6, 7, 8, or 9 carbon atoms and/or not more than 2, 3, 4, 5, 6, 7, 8, 9, or 10 carbon atoms, and the alkyl group may include a hydroxyl group, an alkoxy group, or a halogen atom. Each of X, Y, and Z independently denotes a hydrogen atom, a formyl group, or an alkanoyl group having a carbon number of from at least 2, 3, 4, 5, 6, 7, 8, or 9 carbon atoms and/or not more than 2, 3, 4, 5, 6, 7, 8, 9, or 10 carbon atoms.

The EVOH may also contain, as a copolymer unit, a small amount of another monomer unit other than the ethylene unit and the vinyl alcohol unit within a range not to inhibit the purpose of the present invention. Examples of such a monomer include α-olefins such as propylene, 1-butene, isobutene, 4-methyl-1-pentene, 1-hexene, and 1-octene; unsaturated carboxylic acids such as itaconic acid, methacrylic acid, acrylic acid, and maleic acid, salts thereof, partial or complete esters thereof, nitriles thereof, amides thereof, and anhydrides thereof; vinylsilane compounds such as vinyltrimethoxysilane, vinyltriethoxysilane, vinyltri(2-methoxyethoxy)silane, and γ-methacryloxypropyltrimethoxysilane; unsaturated sulfonic acids or salts thereof, unsaturated thiols; and vinylpyrrolidones.

The barrier layer may be formed from the EVOH or a resin composition containing the EVOH. In some embodiments, the resin composition containing the EVOH may contain other optional components within a range not to impair the effects of the present invention. Examples of such other components include, for example, a boron compound, an alkali metal salt, a phosphoric acid compound, an oxidizable substance, another polymer, and an oxidization accelerator.

Addition of a boron compound to the EVOH resin composition may be advantageous in terms of improving melt viscosity of the EVOH and obtaining a homogenous co-extrusion molded product or a co-injection molded product. Examples of suitable boron compounds include boric acids, a boric acid ester, a boric acid salt, and boron hydrides. Specific examples of the boric acids include orthoboric acid (hereinafter, also merely referred to as "boric acid"), metaboric acid and tetraboric acid. Specific examples of the boric acid ester include triethyl borate and trimethyl borate. Specific examples of the boric acid salt include alkali metal salts and alkaline earth metal salts of the above various types of boric acids, and borax. Among these compounds, orthoboric acid is preferred.

When a boron compound is added, the content of the boron compound in the composition is typically at least about 20, 50, 100, 200, 400, 600, 800, 1000, 1200, 1400, 1600, or 1800 ppm, and/or not more than 50, 100, 200, 400, 600, 800, 1000, 1200, 1400, 1500, 1600, 1800, or 2000 ppm, in terms of the boron element equivalent. The content of the boron compound in this range can give EVOH that is produced while torque variation is suppressed during heat melting.

The EVOH resin composition may also contain an alkali metal salt in an amount of at least about 5, 20, 30, 60, 80, 100, 500, 1000, 2000, 3000, or 4000 ppm and/or not more than about 60, 80, 100, 500, 1000, 2000, 3000, 4000, or 5000 ppm, in terms of the alkali metal element equivalent. The resin composition containing an alkali metal salt in the above range can improve the interlayer adhesiveness and the compatibility. An alkali metal is exemplified by, for example, lithium, sodium, and potassium, and the alkali metal salt is exemplified by, for example, an aliphatic carboxylic acid salt, an aromatic carboxylic acid salt, a phosphoric acid salt, and a metal complex of the alkali metal. Examples of the alkali metal salt include sodium acetate, potassium acetate, sodium phosphate, lithium phosphate, sodium stearate, potassium stearate, and sodium salts of ethylene diamine tetraacetic acid. Especially, sodium acetate, potassium acetate, and sodium phosphate are preferred.

The EVOH resin composition may also contain a phosphoric acid compound in an amount of at least about 1, 5, 10, 20, 40, 60, 80, 100, 200, 300, or 400 ppm and/or not more than about 20, 40, 60, 80, 100, 200, 300, 400, or 500 ppm, in terms of the phosphate radical equivalent. Blending the phosphoric acid compound in the above range can improve the thermal stability of the EVOH and suppress, in particular, generation of gel-state granules and coloring during melt molding for a long period of time.

The type of the phosphoric acid compound added to the EVOH resin composition is not particularly limited, and there can be used, for example, various types of acids such as phosphoric acid and phosphorous acid, and salts thereof. The phosphoric acid salt may be any form of a primary phosphoric acid salt, a secondary phosphoric acid salt, and a tertiary phosphoric acid salt. Although the cation species of the phosphoric acid salt is not also particularly limited, an alkali metal or an alkaline earth metal is preferred as the cation species. Especially, the phosphorus compound is preferably added in the form of sodium dihydrogen phosphate, potassium dihydrogen phosphate, disodium hydrogen phosphate or dipotassium hydrogen phosphate.

The EVOH resin composition may also contain various types of other additives within a range not to impair the effects of the present invention. Examples of such other additives include an antioxidant, a plasticizer, a heat stabilizer (melt stabilizer), a photoinitiator, a deodorizer, an ultraviolet ray absorber, an antistatic agent, a lubricant, a colorant, a filler, a drying agent, a bulking agent, a pigment, a dye, a processing aid, a fire retardant, and an anti-fogging agent.

In some embodiments, EVOH may comprise ethylene-vinyl alcohol copolymer modified with polyamide. A content of amide in EVOH, relative to EVOH as a whole, may be 1% by mass or more, more than 2% by mass or more, or 5% by mass or more, and 20% by mass or less, 15% by mass or less, 10% by mass or less, or 5% by mass or less.

In some embodiments, the polyamide that modifies EVOH may be polycaproamide (nylon 6), poly-ω-aminoheptanoic acid (nylon 7), poly-ω-aminononanoic acid (nylon 9), polyundecaneamide (nylon 11), polylauryl lactam (nylon 12), polyethylene diamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), Polyoctamethylene adipamide (nylon 86), polydecamethylene adipamide (nylon 106), caprolactam/lauryllactam copolymer (nylon 6/12), caprolactam/ω-aminononanoic acid copolymer (nylon 6/9), caprolactam/hexamethylenediammonide adipate copolymer (nylon 6/66), lauryllactam/hexamethylenediammonium adipate copolymer (Nylon 12/66), ethylene diamethylene adipate/hexamethylene diamethylene adipate copolymer (Nylon 26/66), caprolactum/hexamethylene diamethylene adipate/hexamethylene diamethylene sevacate polymer (nylon 6/66/610), ethylenediamethylene adipate/hexamethylenediammonide adipate/hexamethylenediammonium sebacate copolymer (nylon 26/66/610), polyhexamethylene isophthalamide (nylon 6I), polyhexamethylene terephthalamide (nylon 6T), hexamethylene isophthalamide/hexamethylene terephthalamide copolymer (nylon 6I/6T), 11-aminoundecaneamide/hexamethylene terephthalamide copolymer, polynonamethylene terephthalamide (nylon 9T), polydecamethylene terephthalamide (nylon 10T), polyhexamethylenecyclohexylamide, polynonamethylenecyclohexylamide, or these polyamides modified with aromatic amines such as methylenebenzylamine and metaxylene diamine.

In embodiments having nylon, a content of nylon in the barrier layer may be between about 1-50% by mass, about 1-45% by mass, about 1-40% by mass, about 1-35% by mass, or about 1-30% by mass. In some embodiments, a content of nylon in the barrier layer may be at least 1, 2, 3, 4, 5, 6, 7, 8, 9, 10, 11, 12, 13, 14 or 15% by mass, and/or 50, 49, 48, 47, 46, 45, 44, 43, 42, 41, 40, 39, 38, 37, 36, 35, 34, 33, 32, 31, 30, 29, 28, 27, 26, 25% by mass or less.

The thickness of the gas barrier layer is not particularly limited but may be between about 0.1% and about 50%, between about 0.5% and about 40%, between about 1% and about 30%, or between about 2% and about 20%, relative to a total thickness of the multilayer structure. In some embodiments, the thickness of the barrier layer may not be particularly limited, and may be typically at least about 50, 100, 150, 200, 300, 400, 500, 600, 700, 800, or 900 μm, and/or not more than 100, 150, 200, 300, 400, 500, 600, 700, 800, 900, or 1000 μm.

Second Polyolefin Layer

The multilayer structures discussed herein may include a second polyolefin layer. The second polyolefin layer comprises a second polyolefin resin. The second polyolefin resin is not limited to any particular type of resin but can comprise, for example, polypropylene, polyethylene, polybutene, polymethylpentene, and ethylene-α-olefin copolymers. In some embodiments, the first polyolefin resin is a polypropylene. The amount of the second polyolefin resin, as a mass percentage of the second polyolefin layer, may be more than about 50%, more than about 60%, or more than about 70%.

From the viewpoint of recyclability, the content of second polyolefin resin in some embodiments may be polypropylene, the content of which may be about 50% by mass or more, about 60% by mass or more, about 90% by mass or more, about 95% by mass or more, or about 98% by mass or more, relative to the total mass of the second polyolefin layer.

The thickness of the second polyolefin layer (T2) is not particularly limited. In some embodiments, the second polyolefin layer may have a thickness (T2) between about 10 micron and about 400 μm, between about 20 μm and 300 μm, or between about 30 μm and about 200 am. In some embodiments, the second polyolefin layer, T2, has a thickness of at least 10, 15, 20, 25, 30, 35, 40, 45, 50, 55, 60, 65, 70, 75, 80, 85, 90 or 95 μm, and/or about 400, 350, 300, 250, 200, 150, 100, 95, 90, 85, 80, 75, 70, 65 μm or less. In some embodiments, the second polyolefin layer may have a thickness (T2) that is different from a thickness of the first polyolefin layer (T1). In some embodiments, the difference between T1 and T2 leads to an asymmetry in the cross section of the multilayer structure about an axis that goes through a midpoint of a thickness of the multilayer structure.

In some embodiments, the second polyolefin layer may have a water vapor transmission rate (WVTR) that differs from the WVTR of the first olefin layer.

In some embodiments, the second polyolefin resin has a glass transition temperature (Tg) that is different from the Tg of the elastomer. For example, the difference between the two glass transition temperatures may be more than about 5° C., more than about 10° C., more than about 15° C., or more than about 20° C.

Additional Layers

The multilayer structures described herein may include additional layers to the first polyolefin layer, the gas barrier layer, and the second polyolefin layer. For example, in some embodiments, the multilayer structures may include a tie layer. In some embodiments, the tie layer may be formed from tie resins.

Typical examples of suitable tie resins include carboxyl group-containing modified polyolefin resins obtained by chemically binding an unsaturated carboxylic acid (e.g., maleic acid) or an anhydride thereof (e.g., maleic anhydride) to a polyolefin resin. Specific examples of the tie resin include polyethylenes modified with maleic anhydride, polypropylenes modified with maleic anhydride, a maleic anhydride-modified ethylene-ethyl acrylate copolymer, and a maleic anhydride-graft-modified ethylene-vinyl acetate copolymer. In terms of mechanical strength and molding processability, polyethylenes modified with maleic anhydride and polypropylenes modified with maleic anhydride are preferable, and polyethylenes modified with maleic anhydride are particularly preferable among these.

In another aspect, the tie layer may include an acid-functionalized polymer resin composition.

In another aspect, the acid-functionalized polymer resin composition comprises a carboxyl group-containing modified polyolefin resin obtained by chemically binding an unsaturated carboxylic acid to a polyolefin resin.

In another aspect, the acid-functionalized polymer resin composition comprises a carboxyl group-containing modified polyolefin resin obtained by chemically binding an anhydride of an unsaturated carboxylic acid to a polyolefin resin.

In another aspect, the carboxyl group-containing modified polyolefin resin comprises at least one of a polyethylene modified with maleic anhydride and a polypropylene modified with maleic anhydride.

In another aspect, the acid-functionalized polymer resin composition comprises at least one of a polyethylene modified with maleic anhydride, a polypropylene modified with maleic anhydride, a maleic anhydride-modified ethylene-ethyl acrylate copolymer, and a maleic anhydride-graft-modified ethylene-vinyl acetate copolymer.

In some embodiments, the tie layer may be an adhesive layer for adhesion between the first polyolefin layer and the gas barrier layer, the barrier layer and the second polyolefin layer. In some embodiments, the tie layer may be interposed between these layers.

In another aspect, the tie layer is directly adhered to both of the thermoplastic resin layer and the barrier layer.

Regarding the melt viscosity of the tie resin, the MFR at 190° C. and a 2160-g load typically has a lower limit of about 0.1 g/10 minutes, or about 0.2 g/10 minutes, and typically has an upper limit of about 100 g/10 minutes, or about 60 g/10 minutes. The difference between the MFR of the tie resin and the MFR of the EVOH resin composition may preferably be small. When the melt viscosity of the tie resin is as described above, an excellent multilayer article having excellent adhesive strength without any layer turbulence may be obtained.

In some embodiments, the tie layer has a thickness of less than 0.2, 0.15 or 0.1 mm.

Package and Use Thereof

In one aspect, the multilayer structure described herein is a packaging material. In one aspect, the present disclosure relates to a package comprising the multilayer structure described herein. In some embodiments, the first polyolefin layer of the multilayer structure is an outer side of the package compared to the second polyolefin layer. In further embodiments, the first polyolefin layer faces outside of the package.

In some embodiments, the package may be a pouch. The described packaging material can be formed as a package including a flexible package, a stand-up pouch, or other configuration depending on the intended end use of the package formed from the packaging material. Suitable end uses include, but are not limited to, packaging for dry or wet foods that are stored and processed at a variety of temperatures including, but not limited to freezing, refrigeration temperatures, room temperature, and heated.

It is also contemplated that the described packaging material may be used to package food that should, throughout its entire storage time in the package, be kept refrigerated (at most approx. 8° C.) in order not to deteriorate or be completely ruined. Additionally, the described packaging material may find use as retortable packages that are intended to be filled with food and, after sealing, be subjected to a heat treatment for the purposes of extending shelf-life at elevated temperature in an atmosphere of high relative humidity. The contents of the package may be stored in the package for up to 1, 2, 3, 4, 5, or 6 months and even longer at ambient temperature, without the contents deteriorating or being ruined. In some embodiments, the packaging material may also find use as aseptic packaging, which typically refers to packaging in which a previously sterilized food is packed in a similarly previously sterilized package under aseptic conditions.

In one aspect, the present disclosure relates to a method of food packaging, the method comprising sealing food in the package described herein. In some embodiments, the method comprises sterilizing the package containing the food. In additional embodiments, the sterilizing comprises adding heat at a temperature of about 100, 105, 110, 115, 120° C. or higher, and/or about 150, 145, 140, 135, 130° C. or lower. In some embodiments, the method comprises retorting of food in the package for a time between about 10 minutes and about 40 minutes at a temperature between about 120° C. and about 130° C. at a pressure between about 1.0 bar and about 3.0 bar, for a time between about 20 minutes and about 30 minutes at a temperature between about 123° C. and about 125° C. at a pressure between about 1.5 bar and about 2.0 bar, or for about 28 minutes at about 124° C. at about 1.8 bar. In some embodiments, the method also comprises vibrating or shaking the package containing the food during the sterilizing or retorting.

EXAMPLES

The present invention is more specifically described by way of examples. The scope of the present invention, however, is not limited to these examples.

Materials Used in Production of Multilayer Films

EVOH 2: EVAL™ L171B, commercially available from Kuraray Co., Ltd. (ethylene content 27 mol %, a degree of saponification 99.9 mol %, MFR of 4.0 g/10 minutes (2100 C, 2,160 g)).

SF1018A nylon 6, commercially available from UBE Industries, Ltd.

Homo PP: PPH 3060 commercially available polypropylene homopolymer from Total

Hybrar: Hybrar H7311F commercially available elastomer from Kuraray Co., Ltd. (Styrene content 12%, Tg −32 deg. C., MFR 0.5 g/10 min at 190 deg. C. 2.0 g/10 min at 230 deg. C., Solution viscosity 90 mPa·s at 15 wt %, 240 mPa·x at 20 wt %, Hardness Type A 41)

Tafmer: Tafmer PN-9060 commercially available elastomer from Mitsui Chemicals, Inc. (MFR 6.0 g/10 min at 230 deg. C., density 0.868 g/cc, Melting point 160 deg. C., softening point 120 deg. C.)

Outer layers of compounded resin (i.e., HomoPP+Hybrar or HomoPP+Tafmer) were prepared by blending 70 parts by mass of HomoPP and 30 parts by mass of elastomer, Hybrar or Tafmer. Using the below apparatus, the resulting blend was subjected to melt compounding and pelletizing, thereby producing the compounded resin composition.

Apparatus: 27 mmD twin screw extruder (Leistritz ZSE 27 HP, L/D=40)

Extrusion temperature (deg. C.): C1=50, C2=120, C3=190, C4-C10=230, Die=220

PA: UBE Nylon 5033 FD8, commercially available from UBE Industries, Ltd.

Tie: ADMER QF551, commercially available from Mitsui Chemicals, Inc.

PP: PP QR681K, commercially available polypropylene copolymer from Sabic

EVOH 1: 90 parts by mass of EVAL™ L171B, 10 parts by mass of SF1018A and 0.44 parts by mass of magnesium stearate were blended. The resulting blend was subjected to melt compounding, pelletizing and drying under the following conditions using 30 mmΦ twin screw extruder, and then the resin composition was obtained.

Apparatus: 30 mmΦ twin screw extruder (TEX-30a manufactured by The Japan Steel Works, Ltd.)

L/D: 45 Screw: co-rotating full-intermeshing type

Number of die holes: 4 holes (3 mmD)

Extrusion temperature (deg. C.): C2-C4=50, C5=60, C6=80, C7=90 C8=150, C9=190, C-13=230, Die=230

Rotation speed: 150 rpm

Output: about 20 kg/hr

Drying: hot air drying at 80° C. for 6 hr

Preparation of Multilayer Film

Multilayer films were prepared using COLLIN Blown Film Lines, using five extruders under the conditions shown in Tables below.

TABLE 1

Conditions used to prepare PA/EVOH 1/PA/tie/PP

| | Structure 1 | | | | |
|---|---|---|---|---|---|
| | S1 (TOP) 30 mm | S2 25 mm | S3 25 mm | S4 25 mm | S5 (BOTTOM) 30 mm |
| | Material | | | | |
| | PA | EVOH 1 | PA | Tie | PP |
| Vol. Throughput (1/hr) | 2.49 | 1.87 | 2.49 | 1.87 | 7.46 |
| rpm | 47 | 69 | 92 | 69 | 142 |
| T inlet (° C.) | 50 | 50 | | 30 | 30 |
| T Zone 1 (° C.) | 210 | 195 | 210 | 175 | 190 |
| T Zone 2 (° C.) | 235 | 230 | 230 | 200 | 200 |
| T Zone 3 (° C.) | 250 | 250 | 240 | 215 | 220 |
| T Zone 4 (° C.) | 260 | 250 | 250 | 220 | 230 |
| T Adapter (° C.) | 260 | 245 | 250 | 220 | 230 |
| T Hose (° C.) | 260 | 245 | | 220 | 230 |
| T Die (° C.) | 250 | | | | |

The die diameter was 60 mm, the blow up ratio (BUR) was 2.0, and extrusion speed was 5.5 m/min.

TABLE 2

Conditions used to prepare HomoPP + Hybrar 30%/tie/EVOH 1/tie/PP, HomoPP + Tafmer 30%/tie/EVOH 1/tie/PP, and HomoPP/tie/EVOH 1/tie/PP multilayer films

| | Structure 2 | | | | |
|---|---|---|---|---|---|
| | S1 (TOP) 30 mm | S2 25 mm | S3 25 mm | S4 25 mm | S5 (BOTTOM) 30 mm |
| | Material | | | | |
| | PP2 | Tie | EVOH | Tie | PP |
| Vol. Throughput (l/hr) | 3.39-3.76 | 0.54-0.57 | 1.07-2.26 | 0.54-0.57 | 7.92-8.06 |
| rpm | 47 | 69 | 92 | 69 | 142 |
| T inlet (° C.) | 30 | 30 | | 30 | 30 |
| T Zone 1 (° C.) | 190 | 175 | 195 | 175 | 190 |
| T Zone 2 (° C.) | 200 | 200 | 230 | 200 | 200 |
| T Zone 3 (° C.) | 220 | 215 | 250 | 215 | 220 |
| T Zone 4 (° C.) | 230 | 220 | 260 | 220 | 230 |
| T Adapter (° C.) | 230 | 220 | 250 | 220 | 230 |
| T Hose (° C.) | 230 | 220 | | 220 | 230 |
| T Die (° C.) | 220 | | | | |

Additional samples were fabricated in a similar manner with different compositions as set forth in Table 3.

The die diameter was 60 mm, the BUR was 2.5, and the extrusion speed was from 3.8-4.0 m/min.

Measuring and Comparing Water Vapor Transmission Rate (WVTR) and Puncture Strength of Multilayer Films The WVTR of each multilayer film was measured at 38° C. and 90% RH by Cup method using ASTM F96.

The puncture strength for each multilayer film was measured at an outer layer of the multilayer films using SIMAZU AUTOGRAPH AGS-H under 23° C., 500% RH at the speed of 50 mm/min. Results are shown in Table 3 below. B ratio is a thickness ratio of EVOH1 or EVOH2 layer against the total thickness.

TABLE 3

| | Structure | WVTR (A)/ WVTR (B) | Tg (homoPP) - Tg (elastomer) (deg. C.) | B ratio (%) | T (A)/ T(B) | Puncture strength of outer layer (MPa) |
|---|---|---|---|---|---|---|
| Example 1 | HomoPP + Hybrar 30%/ tie/EVOH 1/tie/PP = 31/5/23/4/73 micron | 3.0 | 26 | 17 | 0.425 | 8.7 |
| Example 2 | HomoPP + Tafmer 30%/ tie/EVOH 1/tie/PP = 39/4/9/2/81 micron | 2.6 | 22 | 6 | 0.481 | 7.3 |
| Example 3 | HomoPP + Tafmer 30%/ tie/EVOH 1/tie/PP = 29/5/22/4/66 micron | 2.8 | 22 | 7 | 0.439 | 7.3 |
| Example 4 | HomoPP + Tafmer 15%/ tie/EVOH 1/tie/PP = 35/4/9/3/74 micron | 2.2 | 26 | 8 | 0.473 | 8.5 |
| Example 5 | HomoPP + Tafmer 45%/ tie/EVOH 1/tie/PP = 39/4/8/3/72 micron | 2.7 | 22 | 6 | 0.542 | 8.6 |
| Example 6 | HomoPP + Hybrar 15%/ tie/EVOH 1/tie/PP = 37/4/10/4/68 micron | 3.6 | 26 | 8 | 0.544 | 5.9 |
| Example 7 | HomoPP + Hybrar 30%/ tie/EVOH 1/tie/PP = 41/4/10/5/65 micron | 2.0 | 26 | 8 | 0.631 | 7.6 |
| Comparative 1 (EVOH2 is not for retort) | HomoPP + Tafmer 30%/ tie/EVOH 2/tie/PP = 30/6/22/4/73 micron | 3.0 | 22 | 16 | 0.411 | 7.3 |
| Comparative 2 (no elastomer) | HomoPP/tie/EVOH 1/ tie/PP = 29/4/22/3/68 micron | 1.9 | 0 | 17 | 0.426 | 8.9 |
| Comparative 3 nylon in place of polypropylene polymers) | PA/ EVOH 1/PA/tie/PP = 18/17/28/9/59 micron | — | — | 13 | — | — |

Retort Tests

Static Retort Test

The multilayer films of Table 3 were each cut into square pieces having a 12 cm by 12 cm dimension. Two pieces of each film were stacked upon one another, with the polypropylene copolymer PP layers facing one another (e.g., for each film set forth in Table 3, the "PP" layers face one another). Then, the edges of three sides of the pieces were heat-sealed to produce a bag. Thereafter, 80 mL of deionized water was filled in the bag. The remained one side was sealed with heat sealer to obtain water filled pouch. The water filled pouch composed by the multilayer film was subjected to a hot water treatment at 121° C. for 60 min using a high-temperature and high-pressure static retort sterilization machine (RCS-60/10RSPXG-FAM manufactured by Hisaka Works, LTD). After the hot water treatment, the multilayer film was stored in a room at 20° C. and 65% RH for 1 hour, and the appearance of the multilayer film was visually observed and evaluated according to the following criteria: A having no whitening; B having slight whitening at some parts; and C having whitening at most of parts. For the sealing test, the multilayer film was evaluated according to the following criteria: A having good sealing, B having one pouch failed, and C having bad sealing. For the delamination test, the multilayer film was evaluated according to the following criteria: A having no delamination, B having one pouch failed; and C having delamination. Results are shown in Table 4 below.

Reciprocal Retort (Shaka Retort)

Each multilayer film of Table 3 was cut into square pieces having a 17.8 cm (7 in) by 21.6 cm (8.5 in) dimension for the reciprocal retort. Two pieces of each film were stacked upon one another, with the polypropylene copolymer PP layers facing one another (e.g., for each film set forth in Table 3, the "PP" layers face one another). Then, the edges of three sides of the pieces were heat-sealed to produce a bag. Thereafter, 220 mL of deionized water was filled in the bag for Reciprocal retort. The remaining open edge on one side of each bag was sealed with heat sealer to obtain a water filled pouch. The water filled pouches composed of each of the multilayer films were subjected to a hot water treatment at 121° C. or 135° C. for 15 minutes at 120 shakes per minute (spm) using a high-temperature and high-pressure research retort capable of reciprocal agitation (Allpax 2402). After the hot water treatment, the multilayer film pouches were stored in a room at 20° C. and 6500 RH for 1 hour, and the appearance of the multilayer film for each pouch was visually observed and evaluated according to the following criteria: A=having no whitening; B=having slight whitening at some parts; and C=having whitening at most of parts. For the sealing test, the multilayer film was evaluated according to the following criteria: A=having good sealing, B=having one pouch failed, and C=having bad sealing. For the delamination test, the multilayer film was evaluated according to the following criteria: A=having no delamination, B=having one pouch failed; and C=having delamination. Results are shown in Table 4 (121° C. SHAKA retort test) and Table 5 (135° C. SHAKA retort test) below.

TABLE 4

| | After Static retort | After SHAKA retort (121° C., 15 min) | | |
|---|---|---|---|---|
| | Whitening | Whitening | Sealing | Delamination |
| Example 1 | A | A | A | A |
| Example 2 | A | A | A | A |
| Example 3 | A | A | B | B |
| Example 4 | A | B | A | A |
| Example 5 | A | A (Yellowing) | A | A |
| Example 6 | A | C | A | A |
| Example 7 | A | B | A | A |
| Comparative 1 | B | C | A | C |
| Comparative 2 | A | C | C | C |
| Comparative 3 | A | C | A | C |

TABLE 5

| | After SHAKA retort (135° C., 15 min) | | |
|---|---|---|---|
| | Whitening | Sealing | Delamination |
| Example 1 | A | A | A |
| Example 2 | A | A | A |
| Example 3 | B | B | B |
| Example 4 | B | A | B |
| Example 5 | B | A | C |
| Example 6 | C | A | B |
| Example 7 | C | B | B |
| Comparative 1 | C | B | C |
| Comparative 2 | No data | No data | No data |
| Comparative 3 | No data | No data | No data |

Oxygen Transmission Rate (OTR) Measurement After Retort Treatment

Using two sheets of multilayer film after retort treatment (Shaka retort), the oxygen transmission rate was measured according to the method described in JIS K7126 (isobaric method) under 20° C.-65% RH conditions using the MOCON OX-TRAN 2/20 model manufactured by AMETEK, and the average value was obtained.

After SHAKA retort treatment at 121° C. for 15 minutes, the OTR of the multilayer film in Example 2 was 1.06 $cm^3/[m^2 \cdot day]$ and that of the multilayer film in Example 3 was 0.49 $cm^3/[m^2 \cdot day]$. On the other hand, after SHAKA retort treatment at 135° C. for 15 minutes, the OTR of the multilayer film of Example 2 was 1.31 $cm^3/[m^2 \cdot day]$ and that of the multilayer film of Example 3 was 0.96 $cm^3/[m^2 \cdot day]$.

These results suggest that the OTR after SHAKA retort treatment is lower for films with thicker EVOH layers.

Retort Shock Evaluation

Retort shock was defined as the number of days required for the values to stabilize in the OTR measurement after retorting, and was evaluated.

After SHAKA retort treatment at 121° C. for 15 minutes, the retort shock of the multilayer film in Example 2 was 5 days and that of the multilayer film in Example 3 was 8 days. On the other hand, after SHAKA retort treatment at 135° C. for 15 minutes, the retort shock of the multilayer film of Example 2 was 5 days and that of the multilayer film of Example 3 was 10 days. These results suggest that the retort shock after SHAKA retort treatment is lower for films with thinner EVOH layers.

Embodiments

Embodiment 1. A multilayer structure comprising
- a first polyolefin layer comprising a first polyolefin resin,
- a gas barrier layer comprising ethylene-vinyl alcohol copolymer, and
- a second polyolefin layer comprising a second polyolefin resin, wherein the gas barrier layer is between the first and second polyolefin layer, and a ratio of a water vapor transmission rate (WVTR) of the first polyolefin layer (A) to a WVTR of the second polyolefin layer (B) (A/B) is ≥2.0.

Embodiment 2. The multilayer structure according to embodiment 1, wherein the first polyolefin layer further comprises an elastomer.

Embodiment 3. A multilayer structure comprising
- a first polyolefin layer comprising a first polyolefin resin and an elastomer,
- a gas barrier layer comprising ethylene-vinyl alcohol copolymer, and
- a second polyolefin layer comprising a second polyolefin resin, wherein the gas barrier layer is between the first and second polyolefin layer.

Embodiment 4. The multilayer structure according to any one of embodiment 2 or 3, wherein the elastomer comprises a low crystalline or amorphous α-olefin copolymer.

Embodiment 5. The multilayer structure according to any one of embodiments 2-4, wherein the elastomer comprises a block copolymer comprising an aromatic vinyl polymer block or a hydrogenated product of the block copolymer.

Embodiment 6. The multilayer structure according to embodiment 5, wherein the block copolymer comprises a triblock copolymer having aromatic vinyl polymer end blocks and an aliphatic unsaturated polymer midblock.

Embodiment 7. The multilayer structure according to any one of embodiments 5-6, wherein the aromatic vinyl polymer comprises polystyrene.

Embodiment 8. The multilayer structure according to any one of embodiments 6-8, wherein the aliphatic unsaturated polymer comprises polydiene.

Embodiment 9. The multilayer structure according to embodiment 9, wherein the polydiene comprises 3,4-polyisoprene.

Embodiment 10. The multilayer structure according to any one of embodiments 5-9, wherein the elastomer comprises the block copolymer.

Embodiment 11. The multilayer structure according to any one of embodiments 5-9, wherein the elastomer comprises the hydrogenated product.

Embodiment 12. The multilayer structure according to any one of embodiments 11, wherein the elastomer comprises a hydrogenated block copolymer (A) comprising hydrogenation of a block copolymer having two or more polymer blocks (a) containing structural units derived from an aromatic vinyl compound and one or more polymer blocks (b) containing structural units derived from isoprene and at least one structural unit derived from 1,3-butadiene.

Embodiment 13. The multilayer structure according to embodiments 2-4, wherein the elastomer comprises a triblock copolymer having an aromatic vinyl polymer end blocks and an aliphatic saturated polymer mid-block.

Embodiment 14. The multilayer structure according to embodiment 13, wherein the aromatic vinyl polymer comprises polystyrene.

Embodiment 15. The multilayer structure according to embodiment 14, wherein the aliphatic saturated polymer mid-block comprises poly(3-methyl-1-butene).

Embodiment 16. The multilayer structure according to embodiment 15, wherein the aliphatic saturated polymer mid-block further comprises poly(1-butene).

Embodiment 17. The multilayer structure according to embodiment 16, wherein the aliphatic saturated polymer mid-block comprises a random copolymer block of poly(3-methyl-1-butene) and poly(1-butene).

Embodiment 18. The multilayer structure according to any one of embodiments 5-17, wherein the block copolymer has a styrene content from 5 wt % to 40 wt %.

Embodiment 19. The multilayer structure according to any one of embodiments 5-18, wherein the block copolymer has a styrene content of from 5 wt % to 30 wt %.

Embodiment 20. The multilayer structure according to any one of embodiments 5-19, wherein the block copolymer has a glass transition temperature (Tg) from −40° C. to 10° C. with DSC at 10° C./min.

Embodiment 21. The multilayer structure according to any one of embodiments 5-20, wherein the block copolymer has MFR at 190° C. and 2.16 kg from 0.1 g/10 min to 10 g/10 min measured according to ISO1133.

Embodiment 22. The multilayer structure according to any one of embodiments 5-21, wherein the block copolymer has MFR at 230° C. and 2.16 kg from 1 g/10 min to 25 g/10 min measured according to ISO1133.

Embodiment 23. The multilayer structure according to any one of embodiments 5-22, wherein the block copolymer has a solution viscosity with toluene solution at 30° C. and 20 wt % from 10 mPa s to 1000 mPa s.

Embodiment 24. The multilayer structure according to any one of embodiments 5-23, wherein the block copolymer has a solution viscosity with toluene solution at 30° C. and 30 wt % from 200 mPa s to 3000 mPa s.

Embodiment 25. The multilayer structure according to any one of embodiments 2-24, wherein the elastomer comprises a polypropylene-modified polyethylene.

Embodiment 26. The multilayer structure according to embodiment 25, wherein the polypropylene-modified polyethylene has a softening point of 160° C. or lower.

Embodiment 27. The multilayer structure according to any one of embodiments 2-26, wherein a content of the elastomer in the first polyolefin layer is from 1% to 40% by mass.

Embodiment 28. The multilayer structure according to any one of embodiments 2-27, wherein a difference in a Tg of the first polyolefin resin and a Tg of the elastomer is larger than 20° C.

Embodiment 29. The multilayer structure according to any one of embodiments 2-28, wherein a difference in a Tg of the second polyolefin resin and a Tg of the elastomer is larger than 20° C.

Embodiment 30. The multilayer structure according to any one of the preceding embodiments, wherein the first polyolefin resin comprises polypropylene.

Embodiment 31. The multilayer structure according to any one of the preceding embodiments, wherein the second polyolefin resin comprises polypropylene.

Embodiment 32. The multilayer structure according to any one of the preceding embodiments, wherein a thickness of the first polyolefin layer is different from a thickness of the second polyolefin layer.

Embodiment 33. The multilayer structure according to any one of the preceding embodiments, wherein a ratio of a thickness T1 of the first polyolefin layer to a thickness T2 of the second polyolefin layer (T1/T2) is ≤0.5.

Embodiment 34. The multilayer structure according to any one of the preceding embodiments, wherein a thickness T1 of the first polyolefin layer is from 5 to 80 μm.

Embodiment 35. The multilayer structure according to any one of the preceding embodiments, wherein a thickness T2 of the second polyolefin layer is from 30 to 200 μm.

Embodiment 36. The multilayer structure according to any one of the preceding embodiments, wherein the gas barrier layer comprises ethylene-vinyl alcohol copolymer modified with polyamide.

Embodiment 37. The multilayer structure according to any one of the preceding embodiments, wherein the gas barrier layer further comprises nylon.

Embodiment 38. The multilayer structure according to any one of the preceding embodiments, wherein a content of nylon in the gas barrier layer is from 1 to 30% by mass.

Embodiment 39. The multilayer structure according to any one of the preceding embodiments, wherein a thickness of the gas barrier layer is from 2 to 20% of a total thickness of the multilayer structure.

Embodiment 40. The multilayer structure according to any one of the preceding embodiments, further comprising at least one tie layer.

Embodiment 41. The multilayer structure according to embodiment 40, wherein the at least one tie layer is between two layers selected from the first olefin layer, gas barrier layer, and the second olefin layer.

Embodiment 42. The multilayer structure according to embodiment 40 or 41, wherein the at least one tie layer comprises an acid-modified polyolefin resin.

Embodiment 43. The multilayer structure according to any one of embodiments 40 or 42, wherein the tie layer comprises a maleic anhydride-modified resin.

Embodiment 44. The multilayer structure according to any one of the preceding embodiments, wherein a thickness of the multilayer structure is less than 300 μm.

Embodiment 45. The multilayer structure according to any one of the preceding embodiments, wherein the structure is asymmetric about an axis through a mid-point of a thickness of the multilayer structure.

Embodiment 46. The multilayer structure according to any one of the preceding embodiments, wherein the multilayer structure does not develop pinholes when vibration is applied during a sterilization process in a kiln at a shaking speed of less than 300 spm for a duration of less than 30 minutes.

Embodiment 47. The multilayer structure according to any one of the preceding embodiments, wherein the multilayer structure has a piercing strength measured according to JIS Z 1707: 2019 of 8.8 MPa or less.

Embodiment 48. The multilayer structure according to any one of the preceding embodiments, wherein the multilayer structure is transparent.

Embodiment 49. A package comprising the multilayer structure according to any one of the preceding embodiments.

Embodiment 50. The package according to embodiment 49, wherein the first polyolefin layer is an outer side of the package compared to the second polyolefin layer.

Embodiment 51. The package according to embodiment 49 or 50, wherein the first polyolefin layer faces outside of the package.

Embodiment 52. A method of food packaging, the method comprising sealing food in the package of any one of embodiments 49-51.

Embodiment 53. The method according to embodiment 52, further comprising sterilizing the package containing the food.

Embodiment 54. The method according to embodiment 52 or 53, further comprising vibrating the package containing the food during the sterilizing.

The invention claimed is:

1. A multilayer structure comprising:

a first polyolefin layer comprising a first polyolefin resin and an elastomer, a gas barrier layer comprising ethylene-vinyl alcohol copolymer and a polyamide, and a second polyolefin layer comprising a second polyolefin resin, wherein the gas barrier layer is between the first and second polyolefin layer, and wherein a ratio, A/B, of a water vapor transmission rate (WVTR) (A) of the first polyolefin layer to a WVTR (B) of the second polyolefin layer is ≥2.0.

2. The multilayer structure according to claim 1, wherein the ratio, A/B, satisfies 2.0≤A/B≤3.6.

3. The multilayer structure according to claim 1, wherein the elastomer comprises an elastomer selected from the group consisting of a low crystalline or amorphous a-olefin copolymer, a block copolymer comprising an aromatic vinyl polymer block, and a hydrogenated product of the block copolymer.

4. The multilayer structure according to claim 1, wherein the elastomer comprises a hydrogenated block copolymer (A) comprising hydrogenation of a block copolymer having two or more polymer blocks (a) containing structural units derived from an aromatic vinyl compound and one or more polymer blocks (b) containing structural units derived from isoprene and at least one structural unit derived from 1,3-butadiene.

5. The multilayer structure according to claim 1, wherein a content of the elastomer in the first polyolefin layer is from 1% to 40% by mass, and wherein the elastomer comprises an amorphous a-olefin copolymer.

6. The multilayer structure according to claim 1, wherein a difference in a Tg of the first polyolefin resin and a Tg of the elastomer is larger than 20° C., and wherein a difference in a Tg of the second polyolefin resin and a Tg of the elastomer is larger than 20° C.

7. The multilayer structure according to claim 1, wherein the first polyolefin resin comprises a polypropylene, and the second polyolefin resin comprises a polypropylene.

8. The multilayer structure according to claim 1, wherein there is at least one tie layer between the first olefin layer and the gas barrier layer, and there is at least one tie layer between the gas barrier layer and the second olefin layer.

9. The multilayer structure according to claim 1, wherein a thickness of the multilayer structure is less than 300 μm, wherein a ratio of a thickness T1 of the first polyolefin layer to a thickness T2 of the second polyolefin layer (T1/T2) is ≤0.5, wherein a thickness T1 of the first polyolefin layer is from 5 to 80 μm, wherein a thickness T2 of the second polyolefin layer is from 30 to 200 μm, and wherein a thickness of the gas barrier layer is from 2 to 20% of a total thickness of the multilayer structure.

10. The multilayer structure according to claim 1, wherein a thickness of the first polyolefin layer is different from a thickness of the second polyolefin layer, and the structure is asymmetric about an axis through a midpoint of a thickness of the multilayer structure.

11. The multilayer structure according to claim 1, wherein the multilayer structure is transparent.

12. The multilayer structure according to claim 1, wherein the elastomer comprises a triblock copolymer having aromatic vinyl polymer end blocks and an aliphatic unsaturated polymer mid-block, or a hydrogenated product thereof.

13. The multilayer structure according to claim 12, wherein the aromatic vinyl polymer comprises polystyrene, and the aliphatic unsaturated polymer comprises a polydiene.

14. The multilayer structure according to claim 1, wherein the elastomer comprises a polypropylene-modified polyethylene.

15. The multilayer structure according to claim 14, wherein the polypropylene-modified polyethylene has a softening point of 160° C. or lower.

16. The multilayer structure according to claim 1, wherein the polyamide is a nylon.

17. The multilayer structure according to claim 16, wherein a content of nylon in the gas barrier layer is from 1 to 30% by mass.

18. A package comprising the multilayer structure of claim 1 comprising:

a first polyolefin layer comprising a first polyolefin resin and an elastomer, a gas barrier layer comprising ethylene-vinyl alcohol copolymer, and a second polyolefin layer comprising a second polyolefin resin, wherein the gas barrier layer is between the first and second polyolefin layer.

19. The package according to claim 18, wherein the first polyolefin layer is an outer side of the package compared to the second polyolefin layer, and the first polyolefin layer faces outside of the package.

20. A method of food packaging, the method comprising the step of sealing food in a package comprising the multilayer structure of claim 1 comprising:

a first polyolefin layer comprising a first polyolefin resin and an elastomer, a gas barrier layer comprising ethylene-vinyl alcohol copolymer, and a second polyolefin layer comprising a second polyolefin resin, wherein the gas barrier layer is between the first and second polyolefin layer;

sterilizing the package containing the food; and vibrating the package containing the food during the sterilizing.

* * * * *